Figure 1:
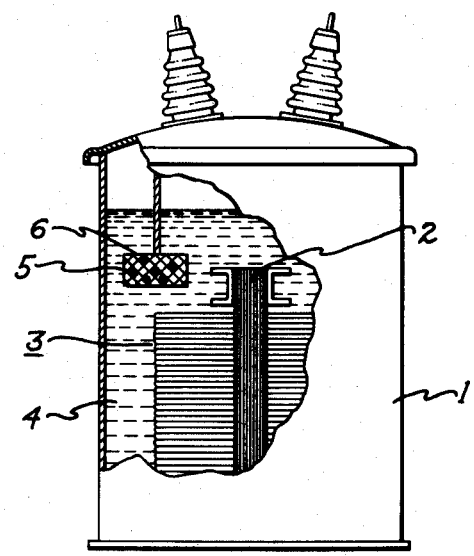

Feb. 23, 1965   K. W. MacFADYEN ETAL   3,170,986
ELECTRICAL APPARATUS AND STABILIZED
DIELECTRIC MATERIAL THEREFOR
Filed Dec. 28, 1959

Inventors,
Kenneth W. MacFadyen,
Anthony J. Polito,
by Sidney Greenberg
Their Attorney.

3,170,986
ELECTRICAL APPARATUS AND STABILIZED
DIELECTRIC MATERIAL THEREFOR
Kenneth W. MacFadyen, Lenox, and Anthony J. Polito,
Pittsfield, Mass., assignors to General Electric Company, a corporation of New York
Filed Dec. 28, 1959, Ser. No. 862,233
3 Claims. (Cl. 174—17)

The present invention relates to electrical apparatus, and more particularly to stabilized halogenated dielectric material for use in electrical apparatus.

Halogenated aromatic compounds, known as askarels in the industry, and specifically chlorinated diphenyl and related compounds, have been widely used in the past as dielectric media in electrical apparatus such as electric transformers for cooling and insulating purposes, these compounds having the advantage over mineral oil dielectrics of being non-inflammable. A difficulty which arises in the use of chlorinated aromatic compounds as dielectric media, however, is that electrical discharges in the apparatus may cause decomposition products of the chlorinated compound to form, particularly hydrogen chloride, which adversely affect the properties of the dielectric liquid and lead to corrosion of the metal parts of the electrical apparatus. To overcome this problem, so-called scavenger or getter materials have been incorporated in the dielectric liquid for removing or neutralizing the effect of the hydrogen chloride and other halogen-containing decomposition products. Of such scavenger materials epoxide compounds such as phenoxy propylene oxide have been found particularly useful heretofore. However, although the epoxide scavengers have been effective in reacting with the hydrogen chloride and thereby largely neutralizing its effects, they have had the drawback that their use in the dielectric liquid is frequently accompanied by unfavorable electrical effects, such as a rise in power factor and a drop in insulation resistance.

It is an object of the invention to provide a stabilized dielectric material of the halogen type, and electrical apparatus incorporating the same.

It is another object of the invention to provide a stabilizer for scavenger-containing dielectric media for improving and maintaining the electrical and other properties thereof.

A specific object of the invention is the provision of a chlorinated aromatic dielectric liquid having an epoxide type of halogen getter therein, wherein adverse effects of the getter on the dielectric liquid are avoided.

The above objects and others which will be apparent from the following description and appended claims are obtained in accordance with the invention in an electrical apparatus which comprises a container in which an electrical device is enclosed and containing a halogenated aromatic compound in contact with the electrical device, the dielectric liquid being subject to decomposition forming undesirable halogen-containing products, an epoxide compound in the dielectric liquid for neutralizing the halogen-containing products, and a zeolite compound in the dielectric liquid for improving the electrical properties of the epoxide-containing dielectric liquid while removing moisture from the dielectric liquid and without removing a significant amount of the epoxide scavenger compound.

Figure 3:
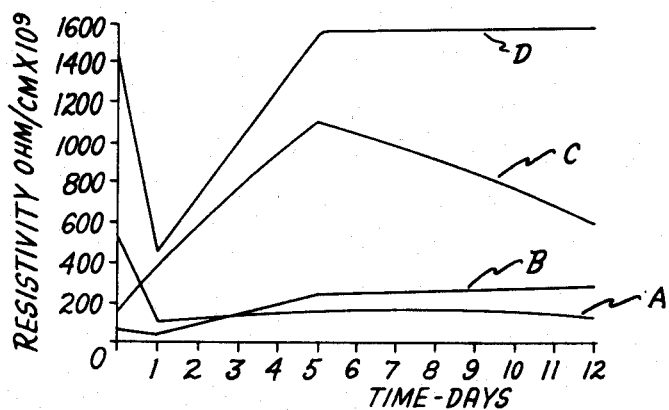
Figure 2:
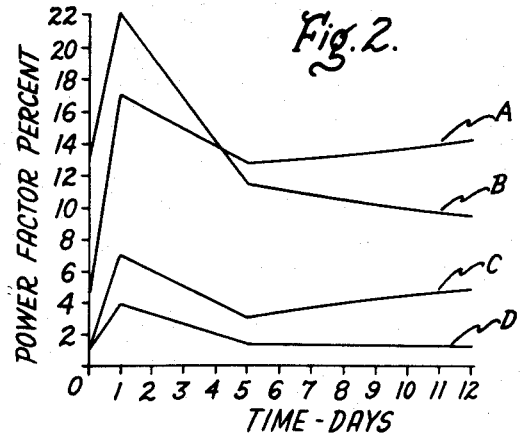

The invention will be better understood from the following description taken in conjunction with the accompanying drawing, in which:

FIG. 1 is a view of a transformer, partly broken away, in which the invention may be embodied;

FIG. 2 graphically illustrates the improved electrical properties imparted to a dielectric liquid in accordance with the present invention; and FIG. 3 is a further graphical showing of improved electrical properties conferred on a dielectric liquid by the present invention.

Referring now to the drawing, there is shown in FIG. 1 a transformer comprising a hermetically sealed tank 1 enclosing a magnetic core 2 and coil 3 comprising high and low voltage windings and partially filled with a dielectric liquid 4 composed essentially of a halogenated aromatic compound, e.g., chlorinated diphenyl, or other askarel type of dielectric liquid, such as chlorinated benzene, chlorinated alkyl benzene, and mixtures of such halogenated aromatic compounds. Dielectric liquid 4 is provided, as conventional in the art, for insulating purposes and to dissipate the heat generated by the apparatus.

Contained in the halogenated aromatic dielectric liquid 4 is an epoxide compound, of the composition more fully described hereinafter, which functions as a scavenger for any hydrogen chloride evolved from the dielectric liquid as a result, for example, of arcing conditions during the operation of the apparatus. Such hydrogen chloride, unless removed or neutralized, will attack the metal and insulation components employed in the transformer, and lead to shortened life or reduced efficiency of the apparatus.

The epoxide scavenger compound is characterized by the group

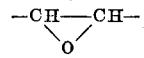

examples of which are glycidyl ethers and derivatives of ethylene oxide. Specific examples of these compounds are phenoxy propylene oxide (phenyl glycidyl ether), glycidyl allyl ether, benzyl ethylene oxide, styrene oxide, 1,3-bis(2,3-epoxy propoxy) benzene, and 4,4'-bis(2,3-epoxy propoxy) diphenyldimethylmethane. In addition, commercially available epoxide compounds which have been found suitable for use in the invention are known as EP107 which is di(2 ethyl hexyl) 4,5 epoxy tetrahydrophthalate, and EP201 which is 3,4-epoxy-6 methyl-cyclohexylmethyl-3,4-epoxy-6-methyl cyclohexanecarboxylate. Mixtures of any two or more of such epoxide compounds may be employed if desired.

In order to overcome the adverse electrical effects encountered in the use of epoxide type scavengers as mentioned above, there is incorporated in the epoxide-containing dielectric liquid, in accordance with the invention, a zeolite compound, and more particularly a synthetic zeolite material of the type known as a molecular sieve, having the structure and composition described more fully below. It has been found that the addition of the synthetic zeolite effectively suppresses the tendency of the epoxide scavenger to raise the power factor and lower the insulating properties of the dielectric liquid, but at the same time the zeolite does not interfere with the hydrogen chloride scavenging properties of the epoxide compound.

In addition to the above significant improvement in epoxide-halogenated aromatic dielectric liquid, which was entriely unexpected, the moisture-absorbing properties of the synthetic zeolite provide additional benefits in maintaining the dielectric liquid and interior of the apparatus desirably free of moisture which would otherwise degrade the electrical properties of the apparatus, as well as corrode the metal parts thereof.

The synthetic zeolite which may be employed in practicing the invention is a crystalline synthetic aluminum silicate of an alkali or alkaline earth metal. It is a high capacity moisture adsorbent which selectively adsorbs molecules on the basis of their size and shape and is called a molecular sieve. The zeolite material, which may be of a variety of species, is generally represented by the formula $M_{2/n}O:Al_2O_3:XSiO_2:YH_2O$, wherein M is a metal such as sodium, calcium, magnesium, lithium, or barium, $n$ is the valence of M, X has an average value of about 1.8 to 2.5 and Y has a value of up to about 8.

In a preferred process, the sodium zeolite, for example, is made by heating a proper mixture in aqueous solution of the oxides $Na_2O$, $Al_2O_3$ and $SiO_2$ (or comopunds producing the oxides) at about 100° C. for periods up to 90 hours or longer, or until the desired crystals are obtained. The crystals are washed with distilled water until the wash water has a pH of about 9 to 12. The thus obtained synthetic zeolite material after activation, such as by drying, is then ready for use.

The composition, structure, methods of preparing, and other details of the synthetic zeolite materials which are useful in accordance with the invention, are fully disclosed in U.S. Patents 2,882,243 and 2,882,244. These disclosures are incorporated by reference in this specification and further description herein of the synthetic absorbent material is accordingly believed unnecessary.

The above-described synthetic zeolites are quite similar in composition and structure to naturally occurring hydrated metal aluminum silicates which are also called zeolites, and it is contemplated that although the synthetic zeolites are particularly suitable for use in the present invention, natural zeolites may also be employed within the scope of the invention.

The zeolite compound may be incorporated in the dielectric liquid of the electrical apparatus in various ways to obtain the benefits of the invention. A preferred form in accordance with the invention is shown in FIG. 1 wherein the zeolite material 5 is contained in a perforated metal basket 6 which is suitably secured to the cover of tank 1 and suspended in contact with the dielectric liquid 4, as shown in the drawing. Alternatively, the zeolite compound may be added in finely divided form to the dielectric liquid 4 and allowed to settle to the bottom. Other methods of providing the necessary contact between the zeolite and the epoxide-containing dielectric liquid, such as by means of a by-pass conduit in which the zeolite is placed, will be found satisfactory.

The amount of synthetic zeolite employed in the dielectric liquid is not critical and may vary widely depending on such factors as the volume and composition of the dielectric liquid, the type and amount of epoxide scavenger employed, and the operating conditions of the apparatus. In a typical case, 0.1% to about 3% by weight of the zeolite may be present in the epoxide-containing dielectric liquid.

In tests conducted to determine the relative effects on electrical properties of transformer dielectric liquid containing an epoxide scavenger by the addition of a zeolite ingredient as compared to the same material without zeolite added, the results shown in FIGS. 2 and 3 of the drawing were obtained. In FIG. 2, the graph shows power factor at 100° C. plotted against the time in days during which the material was aged at 100° C. In the test four different types of samples were used: askarel with two different epoxide scavengers and no zeolite, and the same compositions with zeolite added. The epoxides used were phenoxy propylene oxide and the EP201 material described above. The dielectric compositions were prepared by incorporating 1% by weight of the respective epoxide in a halogenated aromatic compound composed of 45% of hexachlor diphenyl, 40% tricholoro benzene and 15% tetrachlorobenzene, the zeolite-containing compositions having 3% by weight of synthetic zeolite added thereto. In the graph, curve A represents the sample with EP201 without zeolite, curve B phenoxy propylene oxide without zeolite, curve C phenoxy propylene oxide and zeolite, and curve D EP201 and zeolite.

As is evident from the showing in the FIG. 2 graph, the zeolite-containing dielectric liquids manifested in each case remarkably improved power factor characteristics as compared with the same compositions with no zeolite added. Because of the much lower power factor exhibited by the zeolite-containing dielectric liquid, it is a more effective insulating medium. As a result, a transformer incorporating the zeolite-containing compositions described above will function more efficiently since less electrical energy will be dissipated through conversion to heat.

FIG. 3 shows the results in graphic form of the improvement in resistivity characteristics imparted to dielectric liquids of the same composition as those represented in the FIG. 2 graph. In the FIG. 3 graph, resistivity in ohms-cm. as measured at 100° C. is plotted against the time in days of aging at 100° C. The curves as designated in this graph correspond to the samples as designated in FIG. 2. Here, also, the substantial benefits and improved electrical properties by adding synthetic zeolite to the epoxide-askarel composition are quite evident from the graph. In view of the substantially higher resistivity resulting from the zeolite addition, the insulating qualities of the dielectric liquid can be expected to be maintained at a high level during the operating life of the apparatus even under severe operating conditions.

Other advantages have been found to be afforded by the use of synthetic zeolites as described. It has been found, for example, that the zeolite does not remove significant quantities of the scavenger material, as do other adsorbent materials such as activated alumina or fuller's earth, which have been used extensively heretofore for refining dielectric liquids. Tests made in this connection showed that whereas fuller's earth removed 88% of phenoxy propylene oxide in a halogen dielectric liquid, the synthetic sodium zeolite used under the same conditions removed only 14% of the phenoxy propylene oxide scavenger. Thus, the synthetic zeolite is capable of markedly improving and maintaining the electrical properties of insulating fluids in electrical apparatus without serious depletion of soluble scavenger additives which are essential to the efficient operation of the insulating system, and in this respect offers considerable advantage over other adsorbents used heretofore for refining dielectric liquids.

While particular benefits are afforded in accordance with the invention by the use of the described zeolite material in conjunction with an epoxide-containing halogen aromatic dielectric liquid, it also appears that the zeolite itself may serve to improve the electrical properties of halogen aromatic dielectric liquids even in the absence of epoxide or other scavengers. In such function, the zeolite compound removes impurities, contaminants and halogen decomposition products to some extent from the askarel dielectric medium, and the improvement thus afford is not due merely to its removal of moisture. Tests made specifically in this connection on a chlorinated diphenyl dielectric liquid which had been contaminated as a result of long operational use showed that this dielectric liquid treated with synthetic zeolite but no other scavenger additive was considerably improved in power factor and resistivity characteristics by such zeolite treatment. It was found, moreover, that these properties were better than those of other samples of chlorinated diphenyl dielectric liquid with a different scavenger despite the fact that the latter samples had less than half the moisture content of the contaminated sample. In another test it was demonstrated that a sample of contaminated askarel dielectric liquid containing a tin tetraphenyl scavenger and taken from a transformer was remarkably improved after a 20 day contact with synthetic zeolite. Specifically, this treatment reduced the water content from 29 to 11 parts per million, lowered the power factor from 60% to 3.5% and raised the resistivity from $17 \times 10^9$ ohms-cm. to $750 \times 10^9$ ohms-cm.

In view of the benefits obtained by the use of the zeolite in conjunction with halogen types of dielectric liquids, the use of the zeolite adsorbent with gaseous or gaseous-liquid dielectric systems in electrical apparatus, where the gaseous medium is composed, for example, of fluorocarbon material or other halogenated composition, is also contemplated. In such application the zeolite material would operate by adsorption of halogen arc-formed gases and by removal of impurities otherwise produced.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What we claim as new and desire to secure by Letters Patent of the United States is:

1. Electrical apparatus comprising, in combination, a container, an electrical device in said container, a dielectric liquid comprising a halogenated aromatic compound in said container in contact with said electrical device, said dielectric liquid being subject to decomposition forming halogen-containing products, an epoxide scavenger compound in said dielectric liquid for neutralizing said halogen-containing products, and a zeolite compound in contact with said dielectric liquid for improving the electrical properties of the epoxide-containing dielectric liquid while removing the moisture from said dielectric liquid and without removing significant amounts of said epoxide scavenger compound.

2. Electrical apparatus comprising, in combination, a container, an electrical device in said container, a dielectric liquid comprising a chlorinated aromatic compound in said container in contact with said electrical device, said dielectric liquid being subject to decomposition forming halogen-containing products, an epoxide scavenger compound in said dielectric liquid for neutralizing said halogen-containing products, and a zeolite compound in contact with said dielectric liquid for improving the electrical properties of the epoxide-containing dielectric liquid while removing the moisture therefrom and without removing significant amounts of said epoxide scavenger compound.

3. Electrical apparatus comprising, in combination, a container, an electrical device in said container, a dielectric liquid comprising a chlorinated aromatic compound in said container in contact with said electrical device, said dielectric liquid being subject to decomposition forming halogen-containing products, an epoxide scavenger compound in said dielectirc liquid for neutralizing said halogen-containing products, and a crystalline synthetic aluminum silicate having the following composition: $M_{2/n}O:Al_2O_3:XSiO_2:YH_2O$ wherein M is a metal selected from the group consisting of sodium, calcium, magnesium, lithium, and barium, $n$ is the valence of M, X has an average value of about 1.8 to 2.5, and Y has a value of up to about 8, said crystalline synthetic aluminum silicate being arranged in contact with said dielectric liquid for improving the electrical properties of the epoxide-containing dielectric liquid while removing the moisture therefrom and without removing significant amounts of said epoxide scavenger compound.

References Cited by the Examiner

UNITED STATES PATENTS

| 1,922,103 | 8/33 | Layng | 252—63.5 |
| 2,734,926 | 2/56 | Raab et al. | 260—649 |
| 2,840,627 | 6/58 | Lewis | 252—65 |
| 2,882,243 | 4/59 | Milton | 23—112 |
| 2,882,244 | 4/59 | Milton | 23—112 |

OTHER REFERENCES

1958—Linde, Molecular Sieves, Benzene Date Sheets, Form 9695–A, Linde Air Products, New York.

ALBERT T. MEYERS, *Primary Examiner.*

BENNETT G. MILLER, JOSEPH R. LIBERMAN, JULIUS GREENWALD, *Examiners.*